United States Patent
Liang et al.

(10) Patent No.: US 10,062,149 B2
(45) Date of Patent: Aug. 28, 2018

(54) METHODS FOR BLENDING RESEMBLING BLOCKS AND APPARATUSES USING THE SAME

(71) Applicant: VIA Alliance Semiconductor Co., Ltd., Shanghai (CN)

(72) Inventors: Aimin Liang, Beijing (CN); Yuanyuan Wang, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 129 days.

(21) Appl. No.: 15/000,225

(22) Filed: Jan. 19, 2016

(65) Prior Publication Data

US 2017/0124684 A1 May 4, 2017

(30) Foreign Application Priority Data

Nov. 4, 2015 (CN) .......................... 2015 1 0745964

(51) Int. Cl.
*G06T 5/00* (2006.01)
*G06K 9/46* (2006.01)
(Continued)

(52) U.S. Cl.
CPC ............ *G06T 5/002* (2013.01); *G06K 9/4642* (2013.01); *G06K 9/6215* (2013.01); *G06T 5/50* (2013.01);
(Continued)

(58) Field of Classification Search
None
See application file for complete search history.

(56) References Cited

U.S. PATENT DOCUMENTS

2010/0259650 A1* 10/2010 Sasaki ................. G06K 9/6212
348/241
2014/0218571 A1   8/2014 Cheng
(Continued)

FOREIGN PATENT DOCUMENTS

| CN | 103237158 A | 8/2013 |
| CN | 104041002 A | 9/2014 |
| CN | 104168405 A | 11/2014 |

OTHER PUBLICATIONS

Brox, Thomas, Oliver Kleinschmidt, and Daniel Cremers. "Efficient nonlocal means for denoising of textural patterns." IEEE Transactions on Image Processing 17.7 (2008): 1083-1092.*
(Continued)

*Primary Examiner* — Vu Le
*Assistant Examiner* — Tracy Mangialaschi
(74) *Attorney, Agent, or Firm* — McClure, Qualey & Rodack, LLP

(57) ABSTRACT

A method for blending resembling blocks, performed by a processing unit, at least contains: determining a target block of a frame to be fused; determining a search window for the target block and obtaining m neighboring blocks from the search window; calculating the difference between the target block and each neighboring block; selecting n resembling blocks from the m neighboring blocks according to the differences; calculating a weighting for each resembling block; and fusing each pixel value of the target block with corresponding pixel value of each of the resembling blocks according to the weighting.

18 Claims, 9 Drawing Sheets

(51) Int. Cl.
  *G06K 9/62* (2006.01)
  *G06T 5/50* (2006.01)
  *H04N 5/217* (2011.01)
  *H04N 9/04* (2006.01)

(52) U.S. Cl.
  CPC ............ *H04N 5/217* (2013.01); *H04N 9/045* (2013.01); *G06T 2207/10016* (2013.01); *G06T 2207/10024* (2013.01); *G06T 2207/20021* (2013.01); *G06T 2207/20182* (2013.01); *G06T 2207/20216* (2013.01); *G06T 2207/20221* (2013.01)

(56) References Cited

U.S. PATENT DOCUMENTS

| | | | |
|---|---|---|---|
| 2014/0347526 A1 | 11/2014 | Hara et al. | |
| 2015/0206024 A1* | 7/2015 | Sasaki | G06T 5/002 |
| | | | 382/190 |
| 2016/0253787 A1* | 9/2016 | Chen | G06T 5/002 |

OTHER PUBLICATIONS

Dabov, Kostadin, et al. "Image denoising by sparse 3-D transform-domain collaborative filtering." IEEE Transactions on image processing 16.8 (2007): 2080-2095.*

Liu, Yan-Li, et al. "A robust and fast non-local means algorithm for image denoising." Journal of Computer Science and Technology 23.2 (2008): 270-279.*

Shamsi ZH, Kim DG. Multiscale hybrid nonlocal means filtering using modified similarity measure. Mathematical Problems in Engineering. Aug. 27, 2015, 2015.*

Chatterjee, Priyam, and Peyman Milanfar. "Patch-based near-optimal image denoising." IEEE Transactions on Image Processing 21.4 (2012): 1635-1649.*

Romanenko, Ilya V., Eran A. Edirisinghe, and Daniel Larkin. "Block matching noise reduction method for photographic images applied in Bayer RAW domain and optimized for real-time implementation." Real-Time Image and Video Processing. 2012.*

* cited by examiner

| O | X | . | X | O |
|---|---|---|---|---|
| X | . | O | . | X |
| . | O | P | O | . |
| X | . | O | . | X |
| O | X | . | X | O |

FIG. 6

METHODS FOR BLENDING RESEMBLING BLOCKS AND APPARATUSES USING THE SAME

CROSS REFERENCE TO RELATED APPLICATIONS

This application claims the benefit of China Patent Application No. 201510745964.3, filed on Nov. 4, 2015, the entirety of which is incorporated by reference herein.

BACKGROUND

Technical Field

The present invention relates to image processing, and in particular, it relates to methods for blending resembling blocks and apparatuses using the same.

Description of the Related Art

Block blending techniques may be used to eliminate camera noise, to smooth images, and for other purposes. However, it requires an excessive capacity for computation to blend all neighboring blocks for each block. Thus, methods for blending resembling blocks and apparatuses using the same are introduced to reduce the required computation.

BRIEF SUMMARY

An embodiment of a method for blending resembling blocks, performed by a processing unit, at least contains: determining a target block of a frame to be fused; determining a search window for the target block and obtaining m neighboring blocks from the search window; calculating the difference between the target block and each neighboring block; selecting n resembling blocks from the m neighboring blocks according to the differences; calculating a weighting for each resembling block; and fusing each pixel value of the target block with corresponding pixel value of each of the resembling blocks according to the weighting.

An embodiment of an apparatus for blending resembling blocks is introduced. The apparatus at least contains: a frame buffer; and a processing unit coupled to the frame buffer. The frame buffer stores raw data of a frame. The processing unit, coupled to the frame buffer: determines the target block of the frame to be fused; determines a search window for the target block and obtains m neighboring blocks from the search window; calculates the difference between the target block and each neighboring block; selects n resembling blocks from the m neighboring blocks according to the differences; calculates a weighting for each resembling block; fuses each pixel value of the target block with corresponding pixel value of each of the resembling blocks according to the weighting so as to generate a fusion result; and updates the pixel values of the target block of the frame according to the fusion result.

Compared to conventional algorithms for blending the target block with all neighboring blocks, the methods and apparatuses for blending resembling blocks introduced in the embodiments of the invention required less computation.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein:

FIG. 6 is a schematic diagram of neighboring-block data stored in a two-dimensional table of a volatile memory according to an embodiment of the invention;

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
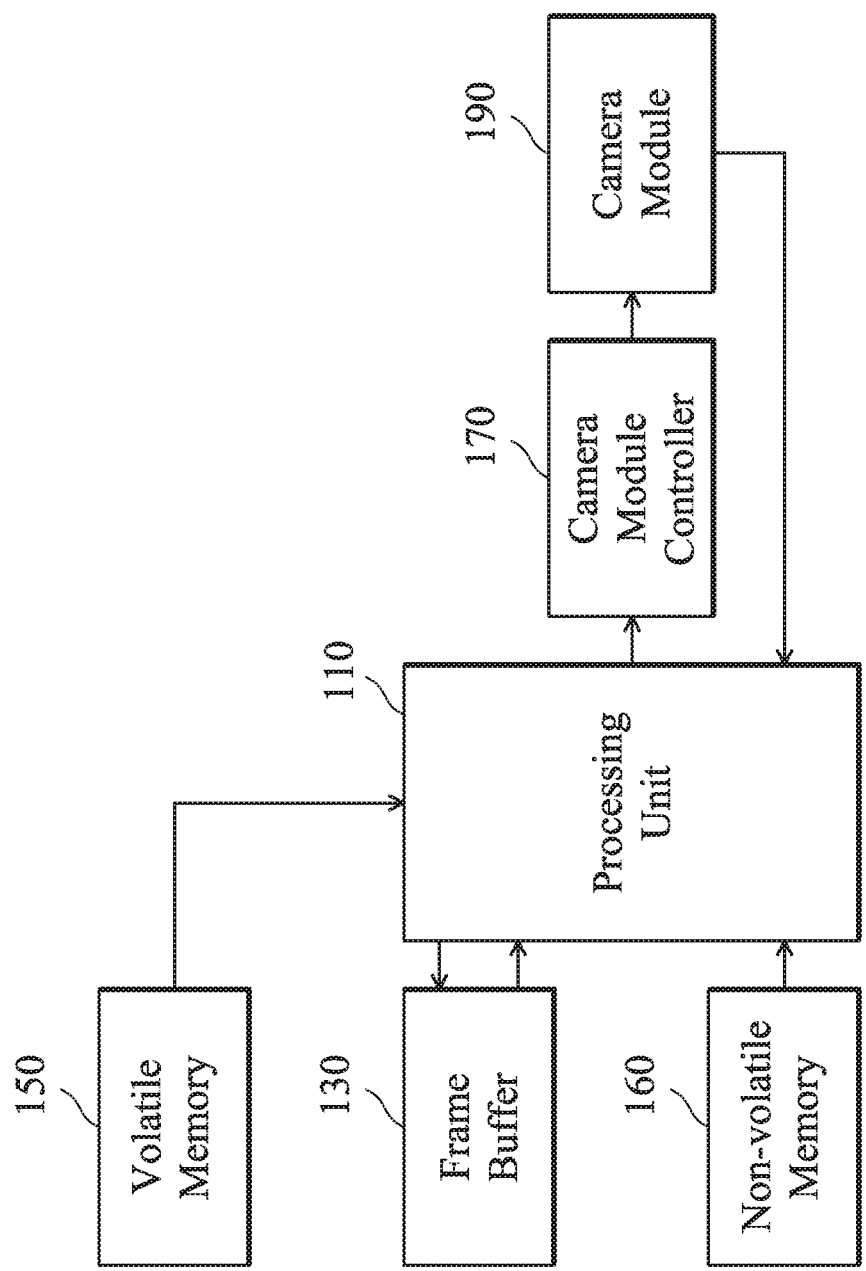
FIG. 1 is a schematic diagram illustrating the system architecture of a computer apparatus according to an embodiment of the invention.

FIG. 1 is a schematic diagram illustrating the system architecture of a computer apparatus according to an embodiment of the invention. The system architecture may be implemented in a desktop computer, a notebook computer, a tablet PC (personal computer), a mobile phone, a digital camera, a digital recorder, or another device which contains at least a processing unit 110. The processing unit 110 can be implemented in numerous ways, such as with dedicated hardware, or with general-purpose hardware (e.g., a single processor, multiple processors or graphics processing units capable of parallel computation, or others) that is programmed using microcode or software instructions to perform the functions recited herein. The processing unit 110 may be integrated in an ISP (Image Signal Processor) to control, via a camera module controller 170, a camera module 190 for capturing multiple frames. The camera module 190 may comprise an image sensor, such as a CMOS (complementary metal-oxide-semiconductor) or CCD (charge-coupled device) sensor, to detect an image in the form of a red, green and blue color, and readout electronic circuits for collecting the sensed data from the image sensor.

The volatile memory 140, such as a DRAM (Dynamic Random Access Memory), for storing necessary data in execution, such as runtime variables, data tables, etc. The method of the invention for blending resembling blocks is performed by the processing unit 110 to begin with acquisition of a frame by controlling the camera module 190 via the camera module controller 170 and store the acquired frame in the frame buffer 130. The processing unit 110 determines a target block of the frame to be fused, determines a search window for the target block and obtains m neighboring blocks from the search window. The processing unit 110 calculates the difference between the target block and each neighboring block, stores the calculated results in the volatile memory 150 and selects n resembling blocks from the m neighboring blocks according to the calculated differences. Next, the processing unit 110 calculates a weighting for each resembling block, stores the calculated results in the volatile memory 150 and fuses each pixel value of the target block with the corresponding pixel values of the resembling blocks according to the calculated weightings so as to generate fusion results. Finally, the processing unit 110 updates the pixel values of the target block of the frame buffer 130 with the fusion results. Compared to conventional algorithms, the invention requires less computation by fusing the target block with the resembling blocks, which has higher similar extent than the others of the neighboring blocks. For example, using DNS (Spatial De-Noise) for eliminating camera noise, the neighboring blocks with higher similarity with the target block are obtained as resembling blocks and pixel values of the target block are fused with pixel values of resembling blocks at corresponding positions. For the noise levels of the resembling pixels are equivalent, better de-noise performance can be achieved by cancelling equivalent amplitudes of noise with the opposite directions. Moreover, compared to conventional algorithms for blending a target block with all neighboring blocks, less computation is required. It should be noted that the invention should not be limited to DNS, the disclosed techniques can be applied to blending a target block with some of the neighboring blocks, which are selected according to their similarity.

Figure 2:
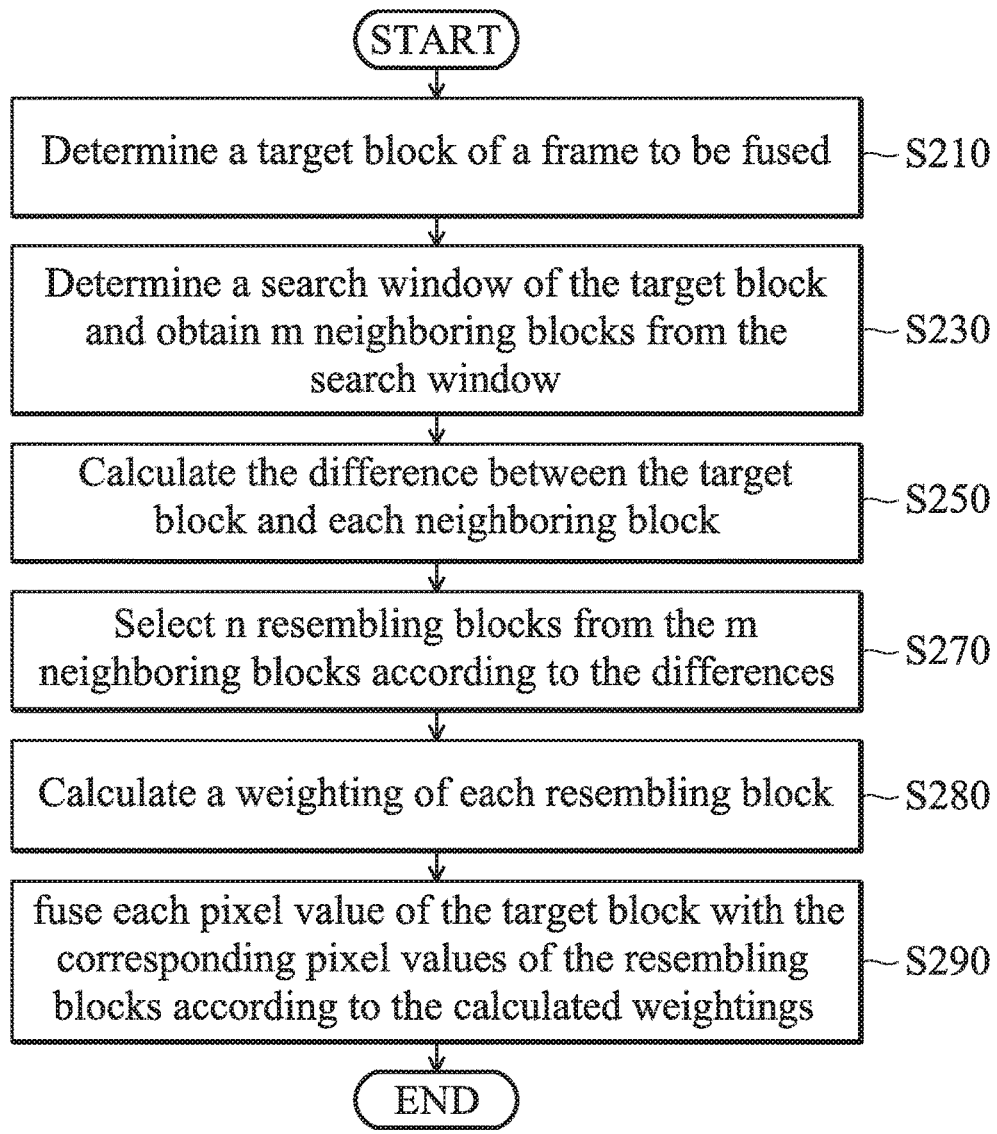
FIG. 2 is a flowchart illustrating a method for blending resembling blocks, which is performed by a processing unit, according to an embodiment of the invention.

FIG. 2 is a flowchart illustrating a method for blending resembling blocks, which is performed by a processing unit, according to an embodiment of the invention. The process begins with acquisition of a target block of a frame to be fused (step S210). A search window is determined for the target block and m neighboring blocks are obtained from the search window (step S230). For example, the target block may contain 3×3 pixels and the search window may contain 11×11 pixels inclusive of the target block as the center thereof. Given an embodiment of a frame with Bayer pattern, 24 neighboring blocks are obtained from the search window, which surround the target block and have the same Bayer pattern as that of the target block. The same Bayer pattern means that channels of the target block and the neighboring block are the same at relative positions, that is, pixels of both the target block and the neighboring blocks at each relative position belong to one of R-, Gr-, Gb- and B channels. The processing unit 110 calculates the difference between the target block and each neighboring block (step S250) and selects n resembling blocks from the m neighboring blocks according to the calculated differences (step S270). Next, the processing unit 110 calculates a weighting for each resembling block (step S280) and fuses each pixel value of the target block with the corresponding pixel values of the resembling blocks according to the calculated weightings so as to generate fusion results (step S290). In step S290, the processing unit 110 may update the pixel values of the target block of the frame buffer 130 with the fusion results.

Figure 3A:
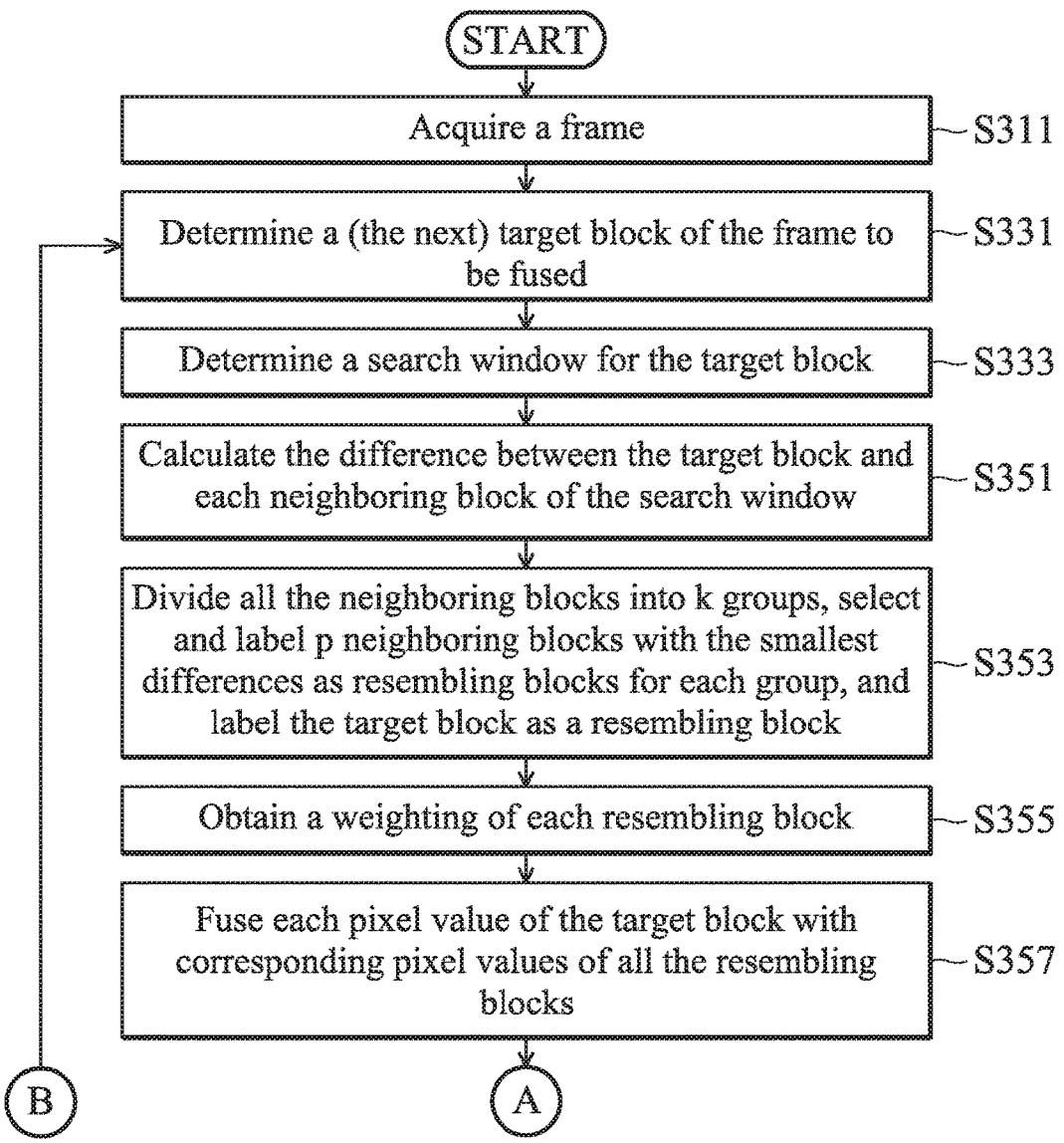
FIG. 3A is a flowchart illustrating a method for DNS by blending resembling blocks, which is performed by a processing unit, according to an embodiment of the invention.
Figure 3A:
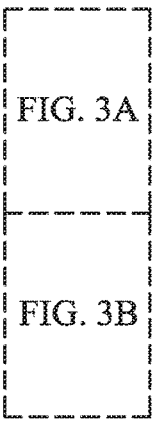
Figure 3B:
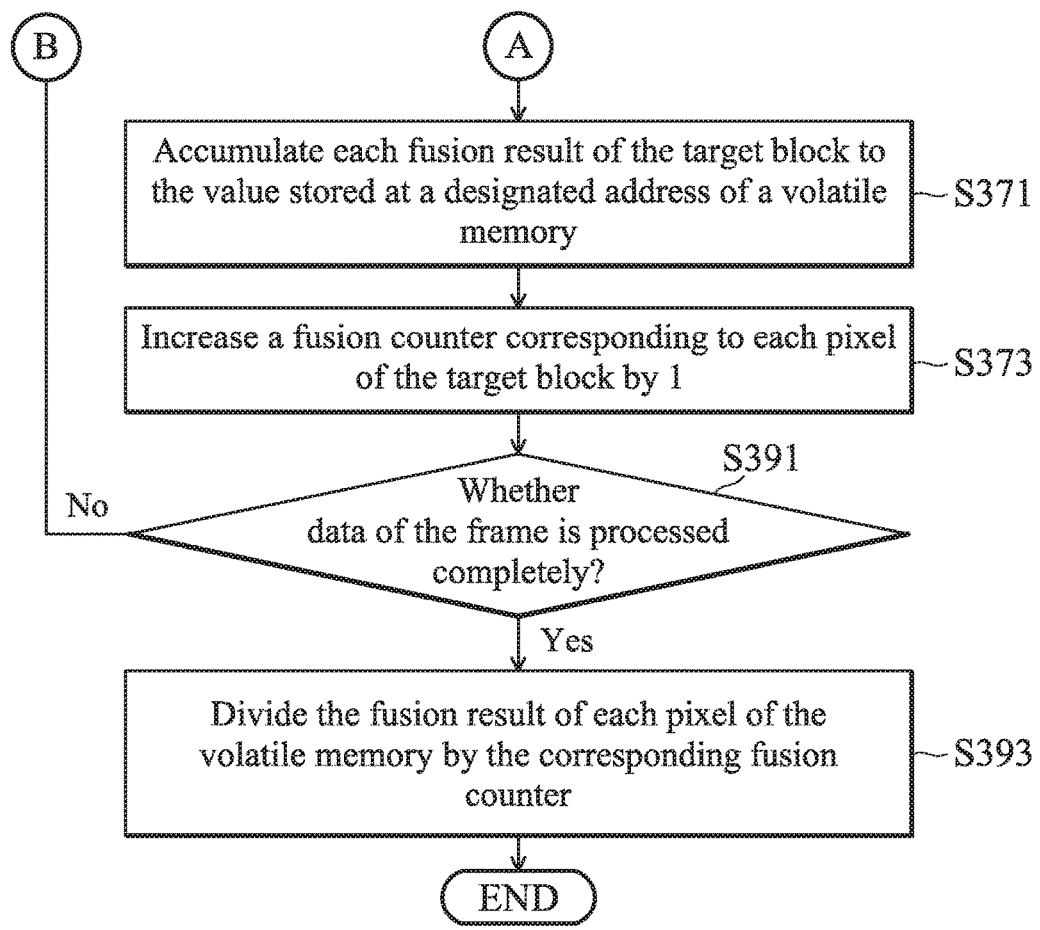
FIG. 3B is also a flowchart illustrating a method for DNS by blending resembling blocks, which is performed by a processing unit, according to an embodiment of the invention.

FIGS. 3A and 3B are flowcharts illustrating a method for DNS by blending resembling blocks, and the flowcharts are performed by the processing unit 110, according to an embodiment of the invention. The process begins with acquisition of a frame by controlling the camera module 190 via the camera module controller 170 (step S311). In step S311 of an embodiment, pixels of the frame form a Bayer pattern and the pixel at each position belongs to one of R-, Gr-, Gb- and B-channels. Raw data of the frame is stored in the frame buffer 130. In addition, the processing unit 110 requests the volatile memory 150 for allocating sufficient space for storing a fusion result and a fusion counter for each pixel of the frame. The fusion counter is initiated at a value of 0 and is increased in value by an increment of 1 each time this pixel is fused with resembling pixels. Next, the processing unit 110 repeatedly executes a loop (steps S331 to S391) until all data of the frame is processed completely (the "Yes" path of step S391).

Figure 4:
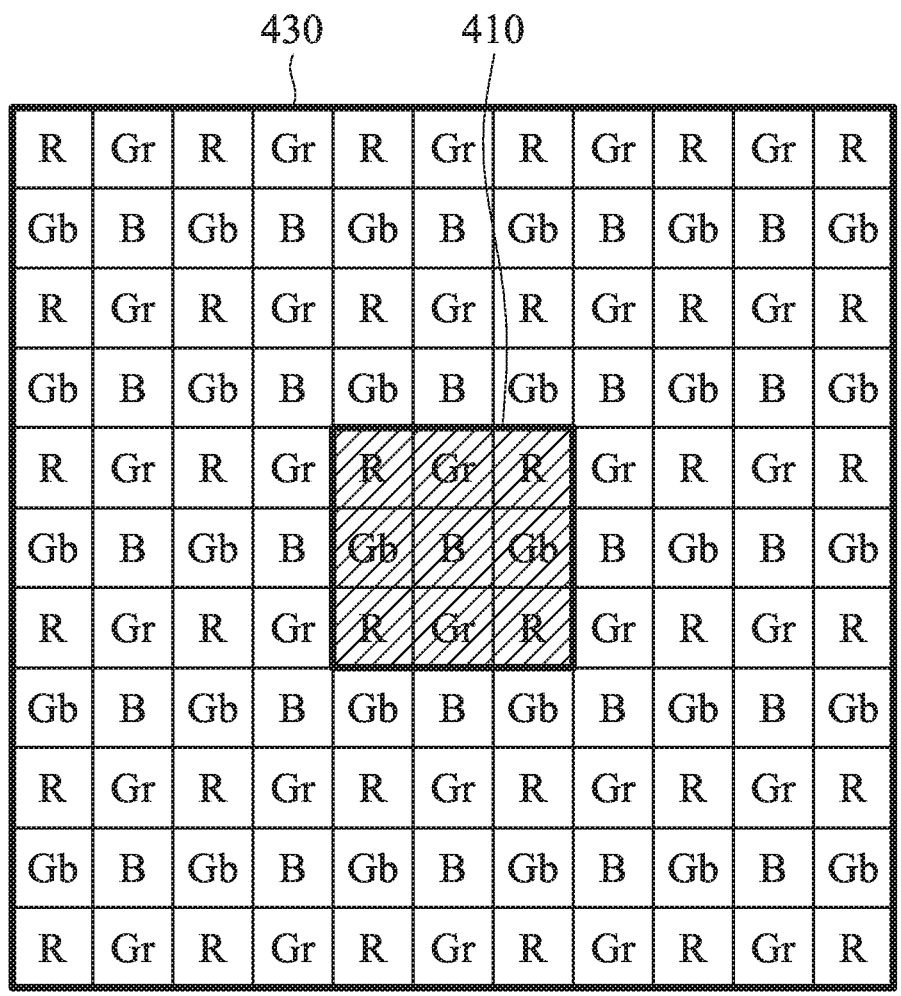
FIG. 4 is a diagram illustrating an acquisition of a search window according to an embodiment of the invention.

In each iteration, the processing unit 110 determines a target block of the frame to be fused (step S331) and determines a search window for the target block (step S333). FIG. 4 is a diagram illustrating an acquisition of a search window according to an embodiment of the invention. For example, in step S331, the processing unit 110 determines the search window 430 for the target block 410 (in slashes) of the Bayer pattern 400, where the target block 410 is composed of 3×3 pixels and the search window 430 contains 11×11 pixels inclusive of the target block 410 as the center. Those skilled in the art may realize the target block in a different size, such as 4×4, 5×5 pixels, etc., depending on design requirements, and the invention should not be limited thereto. Next, the difference between the target block and each neighboring block of the search window is calculated (step S351). In step S351, the processing unit 110 may use a two-dimensional table or a similar data structure to store the difference between the target block and each neighboring block of the search window in the volatile memory 150. Details for calculating the differences in step S351 will be described in FIG. 5. It should be noted that each neighboring block has the same size and Bayer pattern as that of the target block. For example, refer to FIG. 4. The neighboring block contains 3×3 pixels as follows:

{R, Gr, R}
{Gb, B, Gb}
{R, Gr, R}

Figure 5:
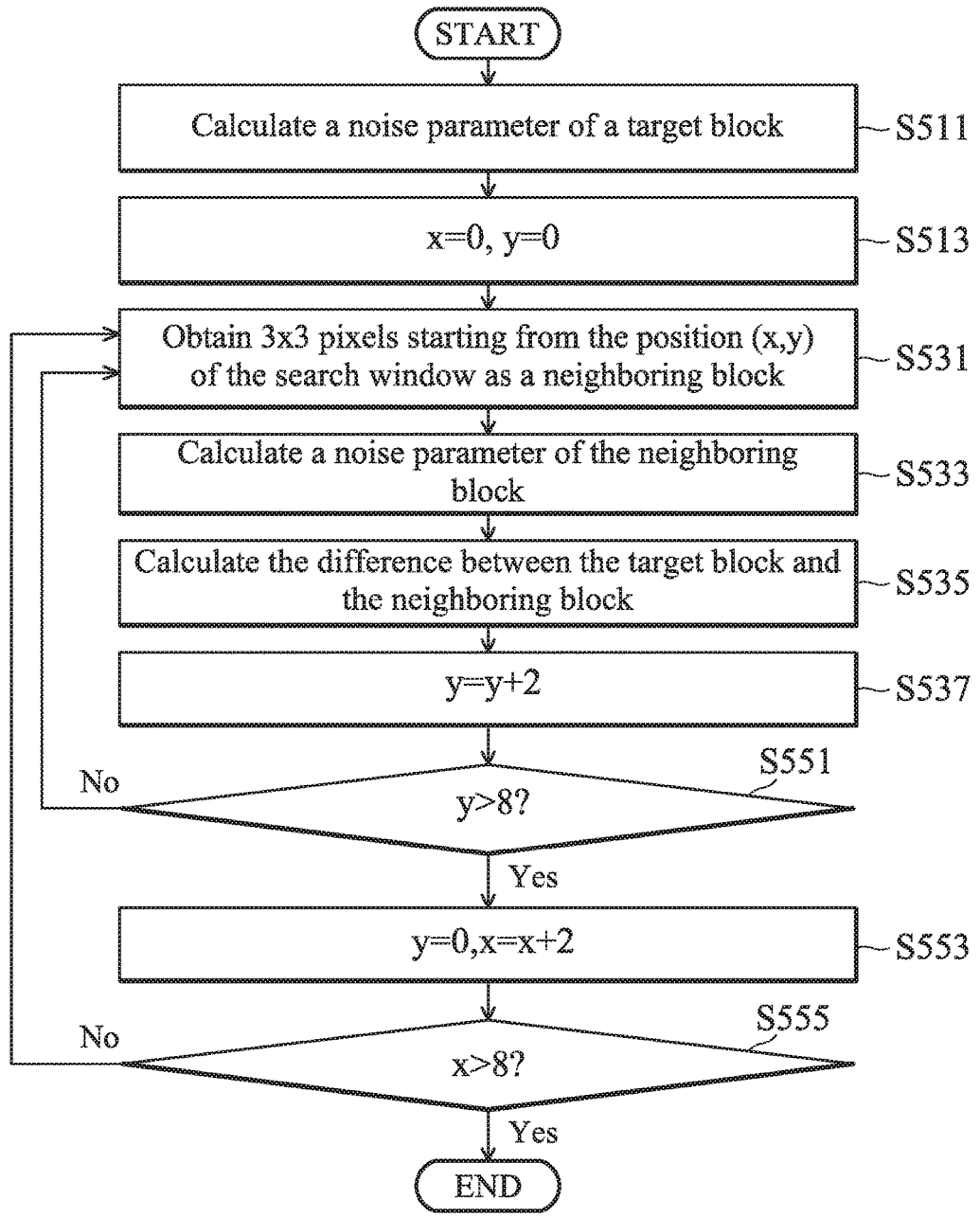
FIG. 5 is a flowchart illustrating a method, performed by a processing unit, for calculating the difference between a target block and each neighboring block of a search window.

FIG. 5 is a flowchart illustrating a method, performed by the processing unit 110, for calculating the difference between a target block and each neighboring block of a search window. Specifically, the processing unit 110 calculates a noise parameter of the target block (step S511) and initiates variables x and y to 0 (step S513). Next, a loop is performed repeatedly to calculate the noise parameter of each neighboring block and the difference between the target block and each neighboring block (steps S531 to S555). In each iteration, 3×3 pixels starting from the position (x,y) of the search window are obtained as a neighboring block (step S531), a noise parameter of the neighboring block is calculated (step S533) and the difference between the target block and the neighboring block is calculated (step S535). Those skilled in the art may realize the calculation of noise parameters in step S511 and S533 by, without limitation, using a noise estimation model, such as a linear model describing relationships between pixel values and noise levels. Moreover, the invention is not limited to calculating the noise parameters of the neighboring blocks when the difference between the target block and each neighboring block is calculated (step S351 of FIG. 3A). In some embodiments, noise parameters of resembling blocks are calculated in step S355 of FIG. 3A with weighting calculations of resembling blocks after the resembling blocks are selected in step S353, rather than calculating noise parameters for all neighboring blocks, so as to further reduce the amount of computation required. In step S535, the difference between the target block and each neighboring block may be calculated using Equation (1) or (2):

$$Diff(x+1, y+1) = \sum_{i=0}^{i=2} \sum_{j=0}^{j=2} (Pn(i, j) - Pt(i, j))^2 \quad (1)$$

$$Diff(x+1, y+1) = \sum_{i=0}^{i=2} \sum_{j=0}^{j=2} |Pn(i, j) - Pt(i, j)| \quad (2)$$

where Diff(x+1,y+1) indicates the difference between the neighboring block having the center (x+1,y+1) and the target block, Pn(i,j) indicates the pixel value at the position (i,j) of the neighboring block and Pt(i,j) indicates the pixel value at the position (i,j) of the target block. It should be noted that each of the target block and the neighboring block of Equation (1) or (2) contains 3×3 pixels as an example. In general, assume that each of the target block and the neighboring block contains (a+1)×(b+1) pixels: The difference between the target block and each neighboring block may be calculated using Equation (3) or (4):

$$Diff(x+1, y+1) = \sum_{i=0}^{i=a} \sum_{j=0}^{j=b} (Pn(i, j) - Pt(i, j))^2 \quad (3)$$

$$Diff(x+1, y+1) = \sum_{i=0}^{i=a} \sum_{j=0}^{j=b} |Pn(i, j) - Pt(i, j)| \quad (4)$$

After the difference between the target block and the neighboring block is calculated, the upper-left position of the next neighboring block is determined (steps S537 to S555). After the variable y is incremented by 2 (step S537), it is determined whether the variable y is greater than 8 (step S551). If so (indicating that the obtained neighboring block starting from the new position (x,y) will be outside of the search window), the variable x is set to 0 and the variable x is increased in value by an increment of 2 (step S553). Otherwise, 3×3 pixels starting from the new position (x,y) of the search window are obtained as a new neighboring block (step S531). After the variables x and y are renewed (step S553), it is determined whether the variable x is greater than 8 (step S555). If so (indicating that the obtained neighboring block starting from the new position (x,y) will be outside of the search window), the process ends. Otherwise, 3×3 pixels starting from the new position (x,y) of the search window are obtained as a new neighboring block (step S531). After the method illustrated in FIG. 5 is completed, the processing unit 110 obtains 24 differences of the neighboring blocks and the target block.

Figure 6:
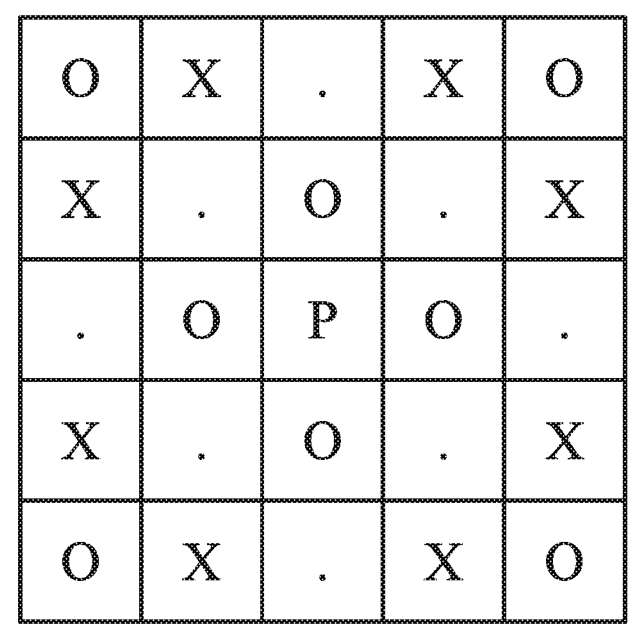
Figure 7:
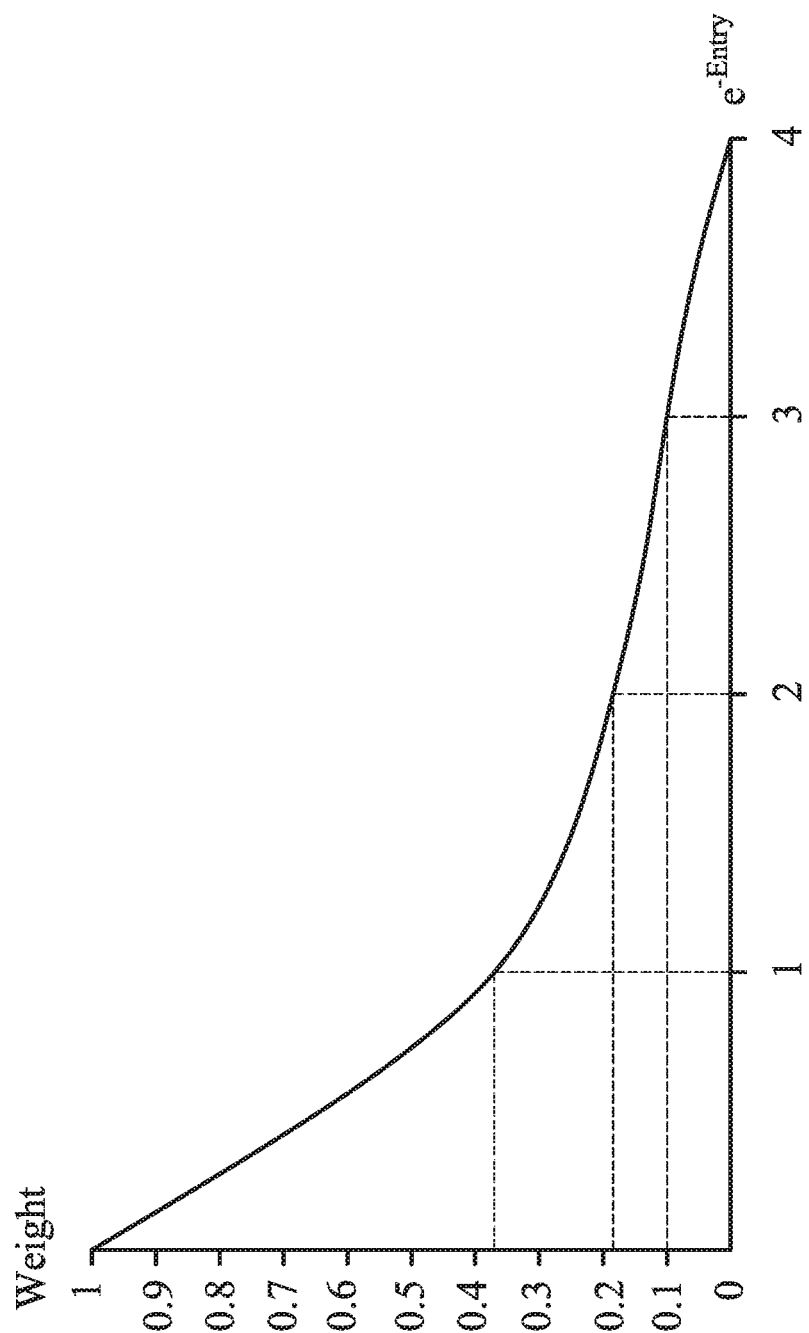
FIG. 7 is a schematic diagram illustrating relationships between weightings and representatives according to an embodiment of the invention.

Now refer back to FIG. 3A. After the difference between the target block and each neighboring block of the search window is calculated (step S351), all the neighboring blocks are divided into k groups, p neighboring blocks with the smallest differences are selected and labeled as resembling blocks for each group, and the target block is labeled as a resembling block, where the total amount of the resembling blocks is n=k×p+1 (step S353). For example, refer to FIG. 4. The search window 400 contains 24 neighboring blocks. FIG. 6 is a schematic diagram of neighboring-block data stored in a two-dimensional table of the volatile memory 150 according to an embodiment of the invention. The two-dimensional table contains 25 cells and each cell stores the noise parameter and the difference of one neighboring block. In another embodiment, each cell of the two-dimensional table only stores the difference of one neighboring block. The data arrangement sequence of the neighboring blocks in the two-dimensional table conforms to the data generation sequence of the neighboring blocks recited in step S531. For example, cell (0,0) stores data regarding the 3×3 neighboring block starting from the position (0,0), cell(0,1) stores data regarding the 3×3 neighboring block starting from the position (0,2), and the following can be deduced by the analogy. In the embodiment, data of 24 neighboring blocks is divided into 3 groups according to the distances of the neighboring blocks from target block denoted as the symbol "P". First group contains data of the neighboring blocks denoted as the symbol "O", second group contains data of the neighboring blocks denoted as the symbol "X" and third group contains data of the neighboring blocks denoted as the symbol "•". In an embodiment, the grouping of the neighboring blocks is performed according to the following steps. The neighboring blocks with the same distances from the target block P are grouped into sub-groups. Assuming that the distance between two adjacent blocks is 1: There are 4 neighboring blocks each with the distance being 1 (the four neighboring blocks "O" being nearer from the target block in FIG. 6), 4 neighboring blocks each with the distance being $\sqrt{2}$ (the four neighboring blocks "•" being nearer from the target block in FIG. 6), 4 neighboring blocks each with the distance being 2 (the four neighboring blocks "•" being farther from the target block in FIG. 6), 8 neighboring blocks each with the distance being $\sqrt{5}$ (the eight neighboring blocks "X" in FIG. 6) and 4 neighboring blocks each with the distance being $\sqrt{8}$ (the four neighboring blocks "O" being farther from the target block in FIG. 6). After that, the 5 sub-groups are merged into the aforementioned 3 groups denoted as "O", "X" and "•". The object of the merging is to make each group has the same quantity of the neighboring blocks as that of the other groups, such as 8, and the averaged distances of the neighboring blocks of the 3 groups are close. That is, the neighboring blocks of each group are evenly spread in the search window. Two neighboring blocks having the smallest differences in each group are selected as resembling blocks. In addition, the target block P is treated as a resembling block. Therefore, there are seven resembling blocks in total. Next, the processing unit 110 obtains a weighting of each resembling block (step S355). In step S355, the processing unit 110 may calculate a representative according to the noise parameter (calculated by using a noise model or calculated in step S351) and the difference of each resembling block and obtain a weighting of the resembling block by searching a lookup table of the non-volatile memory 160 according to the calculated representative. The representative of each resembling block may be calculated using Equation (5) or (6):

$$\text{Entry} = d/\sigma \quad (5)$$

$$\text{Entry} = d^2/2\sigma^2 \quad (6)$$

where Entry indicates the representative, d indicates the difference between the target block and the resembling block calculated in step S351 and σ indicates the noise parameter of the resembling block. Theoretically, the weighting is the exponential decline function of the representative and may be expressed in Equation (7):

$$w(P,Q)=e^{-Entry} \quad (7)$$

where w(P,Q) indicates the weighting ranging from 0 to 1 and Entry indicates the representative. FIG. 7 is a schematic diagram illustrating relationships between weightings and representatives according to an embodiment of the invention. To conform to the relationship of Equation (7), the lookup table of the non-volatile memory 160 stores 64 records, which include 32 records having representatives ranging from 0 to 1 (except for 1), 16 records having representatives ranging from 1 to 2 (except for 2) and 16 records having representatives ranging from 2 to 4.

Figure 8:
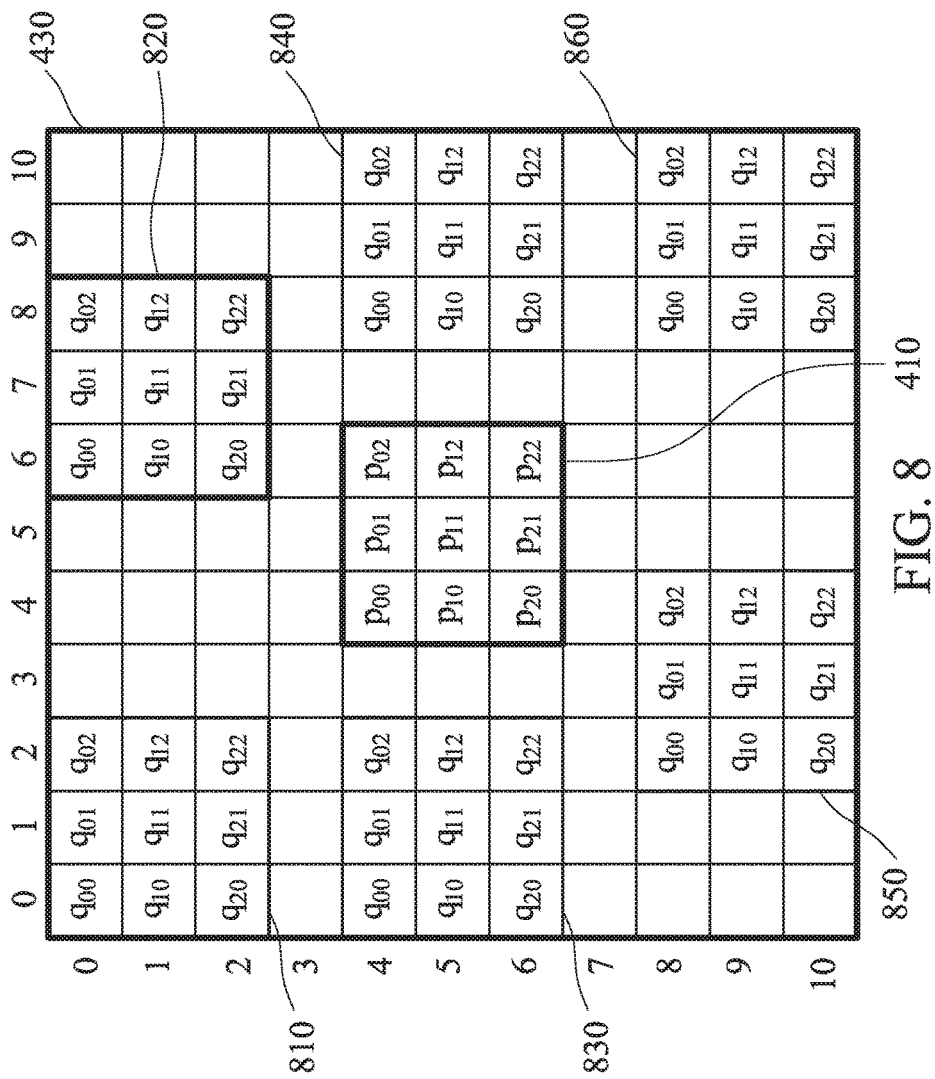
FIG. 8 is a schematic diagram illustrating a target block and resembling blocks according to an embodiment of the invention.

Refer to FIG. 3A. Each pixel value of the target block is fused with corresponding pixel values of all the resembling blocks (step S357). The fusion of each pixel value of the target block may be calculated using Equations (8) and (9):

$$C(P) = \sum_{Q \in B(Q)} w(P, Q) \quad (8)$$

$$u(p_{ij}) = 1/C(P) \sum_{\substack{u(q_{ij}) \in Q \\ Q \in B(Q)}} u(q_{ij}) w(P, Q), \, i, j \in (0, 1, 2) \quad (9)$$

where P indicates the target block, Q indicates one resembling block, B(Q) indicates the set of the resembling blocks, w(P,Q) indicates the weighting of the resembling block, $u(p_{ij})$ indicates a pixel value of the target block and $u(q_{ij})$ indicates a corresponding pixel value of the resembling block. It should be noted that the target block and the neighboring blocks of Equations (8) and (9) contain 3×3 pixels being described as an exemplary case, thus, i,j∈(0, 1, 2), and the invention should not be limited thereto. FIG. 8 is a schematic diagram illustrating a target block and resembling blocks according to an embodiment of the invention. The set B(Q) of Equations (8) and (9) contain 7 blocks including the resembling blocks 810 to 860 and the target block 410 itself, and each resembling block contains 9 pixels $q_{00}$ to $q_{22}$ and the target block 410 contains 9 pixels $p_{00}$ to $p_{22}$.

Next, the processing unit 110 accumulates each fusion result of the target block to the value stored at a designated address of the volatile memory 150 (step S371) and increases the fusion counter corresponding to each pixel of the target block by 1 (step S373). The processing unit 110 subsequently determines whether data of the frame is processed completely (step S391). If so, the fusion result of each pixel of the volatile memory 150 is divided by the corresponding fusion counter so as to generate a final result of the pixel (step S393). Otherwise, the processing unit 110 determines the next target block to be fused (step S331). In the embodiments of each of the target block and the neighboring blocks including 3×3 pixels, each pixel of target blocks except for that in the corners and the edges of the frame is fused for nine times and the corresponding fusion counter is 9.

Although the embodiment has been described in FIG. 1 as having specific elements, it should be noted that additional elements may be included to achieve better performance without departing from the spirit of the invention. While the process flows described in FIGS. 2, 3 and 5 include a number of operations that appear to occur in a specific order, it should be apparent that these processes can include more or fewer operations, which can be executed serially or in parallel, e.g., using parallel processors or a multi-threading environment.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for blending resembling blocks, performed by a processing unit, comprising:
   obtaining a frame from a frame buffer, wherein the frame is generated by a camera module comprising an image sensor to detect the frame;
   determining a target block of the frame to be fused;
   determining a search window for the target block and obtaining m neighboring blocks from the search window;
   grouping the m neighboring blocks with the same distances from the target block into a plurality of subgroups;
   obtaining k groups of the neighboring blocks by merging the sub-groups, wherein each group has the same quantity of the neighboring blocks as that of the other groups, and the averaged distance of the neighboring blocks of each group are close;
   calculating a difference between the target block and each neighboring block;
   selecting at least one resembling block from the neighboring blocks of each group of the k groups according to the differences;
   calculating a weighting for each resembling block;
   fusing each pixel value of the target block with a corresponding pixel value of each of the resembling blocks according to the weighting; and
   updating the pixel values of the target block of the frame according to a fusion result.

2. The method of claim 1, wherein the difference between the target block and each neighboring block may be calculated using one of the following Equations:

$$Diff(x+1, y+1) = \sum_{i=0}^{i=a} \sum_{j=0}^{j=b} (Pn(i, j) - Pt(i, j))^2$$

$$Diff(x+1, y+1) = \sum_{i=0}^{i=a} \sum_{j=0}^{j=b} |Pn(i, j) - Pt(i, j)|$$

where Diff(x+1,y+1) indicates the difference between the neighboring block comprising the center (x+1,y+1) and the target block, Pn(i,j) indicates the pixel value at position (i,j) of the neighboring block, Pt(i,j) indicates the pixel value at position (i,j) of the target block, a total amount of pixels in each column of the target block and the neighboring blocks is a+1 and a total amount of pixels in each row of the target block and the neighboring blocks is b+1.

3. The method of claim 1, wherein the step for selecting the at least one resembling block from the neighboring blocks according to the differences further comprises:
dividing all the neighboring blocks into k groups;
selecting and labeling p of the neighboring blocks with the smallest differences as the resembling blocks for each group; and
labeling the target block as the resembling block.

4. The method of claim 1, wherein the step for selecting the at least one resembling block from the neighboring blocks according to the differences further comprises:
dividing the neighboring blocks into the k groups according to distances between the neighboring blocks and the target block for selecting the at least one resembling block.

5. The method of claim 1, wherein the step for calculating a weighting for each resembling block further comprises:
obtaining a noise parameter of each resembling block;
calculating a representative according to the noise parameter and the difference of each resembling block; and
obtaining the weighting according to the representative of each resembling block.

6. The method of claim 5, wherein the representative of each resembling block is calculated by one of the following Equations:

$Entry = d/\sigma$; and $Entry = d^2/2\sigma^2$, where Entry indicates the representative, d indicates the difference between the target block and the resembling block and $\sigma$ indicates the noise parameter of the resembling block.

7. The method of claim 5, wherein the step for obtaining the weighting according to the representative of each resembling block further comprises:
obtaining the weighting by searching a lookup table according to the representative of each resembling block,
wherein, in the lookup table, the weighting is an exponential decline function of the representative.

8. The method of claim 1, wherein the fusion of the target block with the resembling blocks is calculated using the following Equations:

$$C(P) = \sum_{Q \in B(Q)} w(P, Q); \text{ and}$$

$$u(p_{ij}) = 1/C(P) \sum_{\substack{u(q_{ij}) \in Q \\ Q \in B(Q)}} u(q_{ij}) w(P, Q)$$

where P indicates the target block, Q indicates one resembling block, B(Q) indicates a set of the resembling blocks, w(P,Q) indicates the weighting of the resembling block, $u(p_{ij})$ indicates the pixel value of the target block and $u(q_{ij})$ indicates the corresponding pixel value of the resembling block.

9. The method of claim 1, wherein the search window comprises pixels of a Bayer pattern and the pixel value of the target block is fused with the corresponding pixel value of each of the resembling blocks with a same channel as that of the target block.

10. An apparatus for blending resembling blocks, comprising:
a frame buffer, storing raw data of a frame, wherein the frame is generated by a camera module comprising an image sensor to detect the frame; and
a processing unit, coupled to the frame buffer, determining a target block of the frame to be fused; determining a search window for the target block and obtaining m neighboring blocks from the search window; grouping the m neighboring blocks with the same distances from the target block into a plurality of sub-groups; obtaining k groups of the neighboring blocks by merging the sub-groups, wherein each group has the same quantity of the neighboring blocks as that of the other groups, and the averaged distance of the neighboring blocks of each group are close; calculating a difference between the target block and each neighboring block; selecting at least one resembling block from the neighboring blocks of each group of the k groups according to the differences; calculating a weighting for each resembling block; fusing each pixel value of the target block with a corresponding pixel value of each of the resembling blocks according to the weighting so as to generate a fusion result; and updating the pixel values of the target block of the frame according to the fusion result.

11. The apparatus of claim 10, wherein the difference between the target block and each neighboring block may be calculated using one of the following Equations:

$$Diff(x+1, y+1) = \sum_{i=0}^{i=a} \sum_{j=0}^{j=b} (Pn(i, j) - Pt(i, j))^2$$

$$Diff(x+1, y+1) = \sum_{i=0}^{i=a} \sum_{j=0}^{j=b} |Pn(i, j) - Pt(i, j)|$$

where Diff(x+1,y+1) indicates the difference between the neighboring block comprising the center (x+1,y+1) and the target block, Pn(i,j) indicates the pixel value at position (i,j) of the neighboring block, Pt(i,j) indicates the pixel value at position (i,j) of the target block, a total amount of pixels in each column of the target block and the neighboring blocks is a+1 and a total amount of pixels in each row of the target block and the neighboring blocks is b+1.

12. The apparatus of claim 10, wherein the processing unit divides all the neighboring blocks into k groups; selects and labels p of the neighboring blocks with the smallest differences as the resembling blocks for each group; and labels the target block as the resembling block.

13. The apparatus of claim 10, wherein the processing unit divides the neighboring blocks into the k groups according to distances between the neighboring blocks and the target block for selecting the at least one resembling block.

14. The apparatus of claim 10, wherein the processing unit obtains a noise parameter of each resembling block; calculates a representative according to the noise parameter and the difference of each resembling block; and obtains the weighting according to the representative of each resembling block.

15. The apparatus of claim 14, wherein the representative of each resembling block is calculated by one of the following Equations:

$Entry = d/\sigma$; and $Entry = d^2/2\sigma^2$, where Entry indicates the representative, d indicates the difference between the target block and the resembling block and σ indicates the noise parameter of the resembling block.

16. The apparatus of claim 14, wherein the processing unit obtains the weighting by searching a lookup table according to the representative of each resembling block and, in the lookup table, the weighting is an exponential decline function of the representative.

17. The apparatus of claim 10, wherein the fusion of the target block with the resembling blocks is calculated using the following Equations:

$$C(P) = \sum_{Q \in B(Q)} w(P, Q); \text{ and}$$

$$u(p_{ij}) = 1/C(P) \sum_{\substack{u(q_{ij}) \in Q \\ Q \in B(Q)}} u(q_{ij})w(P, Q)$$

where P indicates the target block, Q indicates one resembling block, B(Q) indicates a set of the resembling blocks, w(P,Q) indicates the weighting of the resembling block, $u(p_{ij})$ indicates the pixel value of the target block and $u(q_{ij})$ indicates the corresponding pixel value of the resembling block.

18. The apparatus of claim 10, wherein the search window comprises pixels of a Bayer pattern and the pixel value of the target block is fused with the corresponding pixel value of each of the resembling blocks with a same channel as that of the target block.

* * * * *